No. 720,861. PATENTED FEB. 17, 1903.
F. E. VAN LOAN.
NEEDLE FOR GRAIN BINDERS.
APPLICATION FILED JULY 18, 1901.

NO MODEL.

Witnesses:
R. J. Jacker
R. K. Gustafson.

Inventor:
Frank E. Van Loan,
By Coburn, McRoberts & McElroy,
Attys.

UNITED STATES PATENT OFFICE.

FRANK E. VAN LOAN, OF ATHENS, PENNSYLVANIA, ASSIGNOR TO THE PLANO MANUFACTURING COMPANY, OF CHICAGO, ILLINOIS, A CORPORATION OF ILLINOIS.

NEEDLE FOR GRAIN-BINDERS.

SPECIFICATION forming part of Letters Patent No. 720,861, dated February 17, 1903.

Application filed July 18, 1901. Serial No. 68,862. (No model.)

*To all whom it may concern:*

Be it known that I, FRANK E. VAN LOAN, a citizen of the United States, residing at Athens, in the county of Bradford and State of Pennsylvania, have made certain new and useful Improvements in Needles for Grain-Binders, of which the following is a specification.

The object of my invention is to provide the needle of a grain-binding machine with an improved guide-pulley located in the eye thereof, so as to reduce the friction between the twine and the needle, the pulley being so constructed and the eye of the needle so shaped that the twine will always strike in the center of the guide-pulley, so as to cause it to rotate under all conditions and prevent the twine from slipping on the pulley and cutting into the same.

Another object of my invention is to prevent the pulley from moving laterally, so as to permit the twine or any fuzz or detached portions thereof from getting between the sides of the pulley and needle-eye, and thus cause it to clog up and stop rotating, under which circumstances the friction of the twine upon the pulley would cut into it in a very short time.

Figure 1:
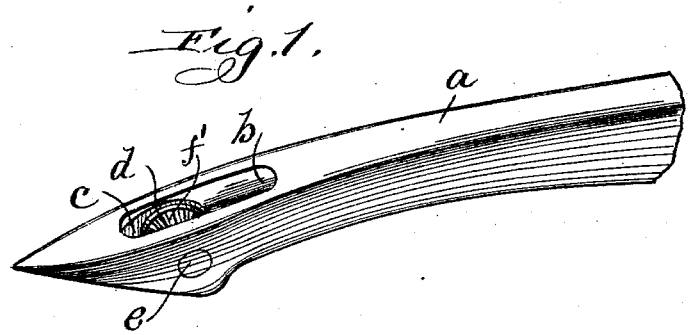
Figure 2:
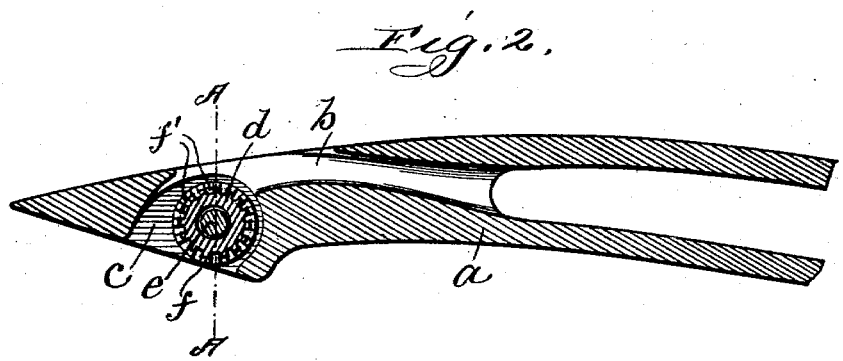
Figure 3:
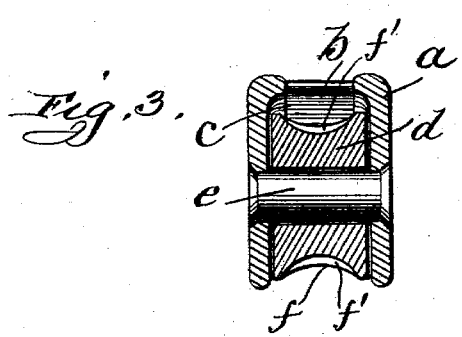

Referring to the accompanying sheet of drawings, in which the same reference characters are used to designate identical parts in all the figures, Figure 1 is a perspective view of the point of the needle provided with a guide-pulley constructed in accordance with my invention. Fig. 2 is a longitudinal section through the end of the needle and the guide-pulley, and Fig. 3 is a transverse section on the line A A of Fig. 2.

The needle-arm $a$ is of the usual or any suitable construction and is provided with the usual channel $b$ for the binding-twine, which is of a size to just permit the ready passage of the twine through the same, being large enough to accommodate any kinks or knots that are liable to be found therein. The channel $b$ opens into the recess $c$, formed on the under side of the needle, and the upper end of the channel $b$ and the recess $c$ form the eye of the needle. As will be best seen from Fig. 3, the width of the recess $c$ is considerably greater than that of the channel $b$, so that it can receive the guide-pulley $d$, which is inserted from the under side and is mounted to rotate upon the pin $e$, the ends of which are swaged in countersunk openings in the sides of the eye of the needle-arm or secured in any other convenient or suitable manner. The pulley $d$ has the groove $f$ formed in the center thereof, of a diameter equal to or greater than that of the width of the channel $b$, so that the twine passing through the said channel will necessarily be directed to the center of said pulley, and the tension of the twine will serve to keep it in the center, and thus prevent the possibility of its working over to the side and getting between the edges of the recess $c$ and the sides of the pulley. The same construction tends to prevent the possibility of any fuzz or other loose material from the twine getting lodged in the manner described. To increase the friction between the surface of the pulley and the twine and to insure the rotation of the pulley, I corrugate the groove transversely by the notches $f$, as seen in Figs. 2 and 3. These corrugations insure the rotation of the pulley, and the twine being directed and forced to the center thereof the pulley will always rotate freely without the possibility of any clogging.

While I have shown my invention as embodied in the form which I at present consider best adapted to carry out its purposes, it will be understood that it is capable of slight changes and that I do not desire to be limited in the interpretation of the following claims save as may be necessitated from the state of the prior art.

What I claim as new, and desire to secure by Letters Patent of the United States, is—

1. A grain-binder needle provided with the recess $c$ on the under side thereof and extending almost to the upper side thereof, with the channel $b$ opening into said recess and being narrower than said recess, and the guide-pulley $d$ mounted to rotate in said recess; substantially as and for the purpose described.

2. A grain-binder needle having the recess $c$ formed in the under side near the point thereof, the guide-pulley $d$ mounted to rotate in said recess and having a transversely-corrugated periphery, and the channel *b* opening into said recess at the upper end thereof above the center of the pulley and being narrower than the thickness of the pulley; substantially as described.

3. A grain-binder needle having the recess *c* formed in the under side near the point thereof, the guide-pulley *d* mounted to rotate in said recess and having the transverse corrugated groove in the periphery thereof, and the channel *b* opening into said recess at the upper end thereof above the center of the pulley and being narrower than the thickness of the pulley; substantially as described.

FRANK E. VAN LOAN.

Witnesses:
A. C. ARNOLD,
EDWARD S. JOHNSON, Jr.